United States Patent [19]
Castellaw et al.

[11] Patent Number: 4,557,310
[45] Date of Patent: Dec. 10, 1985

[54] MOVABLE SUN SHADE SYSTEM

[76] Inventors: Gerald J. Castellaw, 11670 Laurelwood Dr., Studio City, Calif. 91604; Ronald C. Wigham, 1192 Lundy Dr., Simi Valley, Calif. 93065; Edwin N. Ames, 8585 Walnut Dr., Los Angeles, Calif. 90046

[21] Appl. No.: 485,182

[22] Filed: Apr. 15, 1983

[51] Int. Cl.$^4$ .............................................. A47H 5/00
[52] U.S. Cl. .................................................. 160/84 R
[58] Field of Search ...................... 160/84 R, 113, 310; 47/17

[56] References Cited

U.S. PATENT DOCUMENTS

| | | | |
|---|---|---|---|
| 1,070,434 | 8/1913 | Farquhar | 47/17 |
| 1,899,062 | 2/1933 | Steffan | 160/84 R |
| 2,031,157 | 2/1936 | Gilson | 160/120 |
| 3,315,727 | 4/1967 | Clark | 160/84 R |
| 3,487,875 | 1/1970 | Shukat et al. | 160/84 R |
| 3,646,877 | 3/1972 | Ellis | 160/84 R |
| 4,062,146 | 12/1977 | Grossman et al. | 160/84 R |
| 4,374,536 | 2/1983 | Becker | 160/84 R |

FOREIGN PATENT DOCUMENTS

| | | | |
|---|---|---|---|
| 1270759 | 6/1968 | Fed. Rep. of Germany | 160/84 |
| 533128 | 2/1941 | United Kingdom | 160/84 R |

*Primary Examiner*—Ramon S. Britts
*Assistant Examiner*—Cherney S. Lieberman
*Attorney, Agent, or Firm*—John J. Posta, Jr.

[57] ABSTRACT

The sun shade system is for use over window panes, skylights and the like in homes, offices, greenhouses, and other applications. The system includes a plurality, preferably a pair, of parallel tracks disposable on opposite sides of a window or skylight or on window mullions, a plurality of shade carriers secured to and riding in the tracks and a flexible, foldable, resilient sun shade secured along its length to spaced ones of the carriers for movement with the carriers along the tracks. A shade mover such as a hand cord brake assembly or a motorized roller and cord assembly is also provided for urging the shade to a desired location relative to the tracks. Each track may be rectangular in cross-section, and curved or straight along its length, receives the shanks and rollers or slides of the carriers and includes an end stop. Each carrier can include a hook insertable through openings in the shade. A partition can be provided in the track to restrict oscillation of the rollers or slides and shank therein. The system is well adapted for use with a variety of straight, curved and angled windows.

8 Claims, 9 Drawing Figures

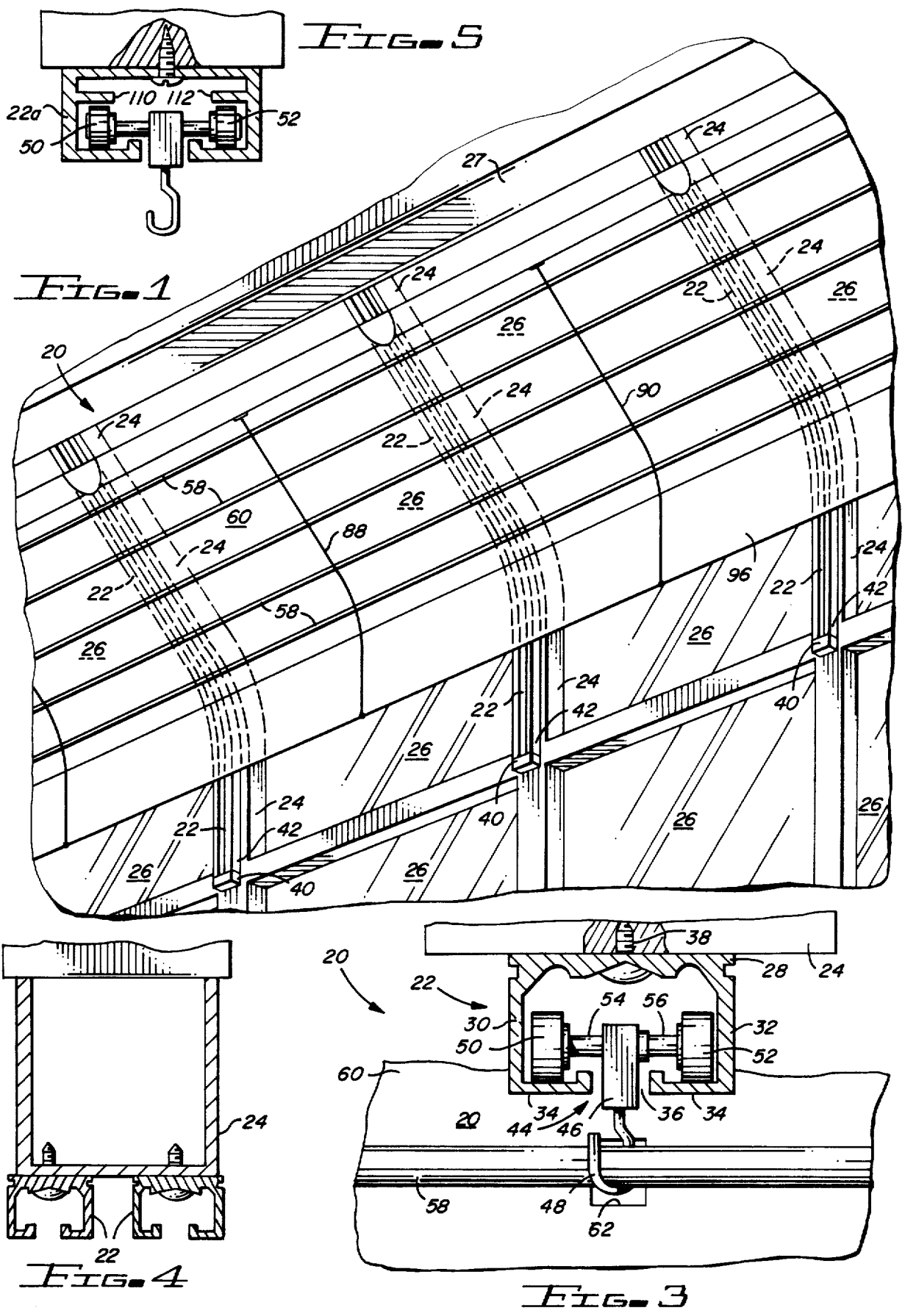

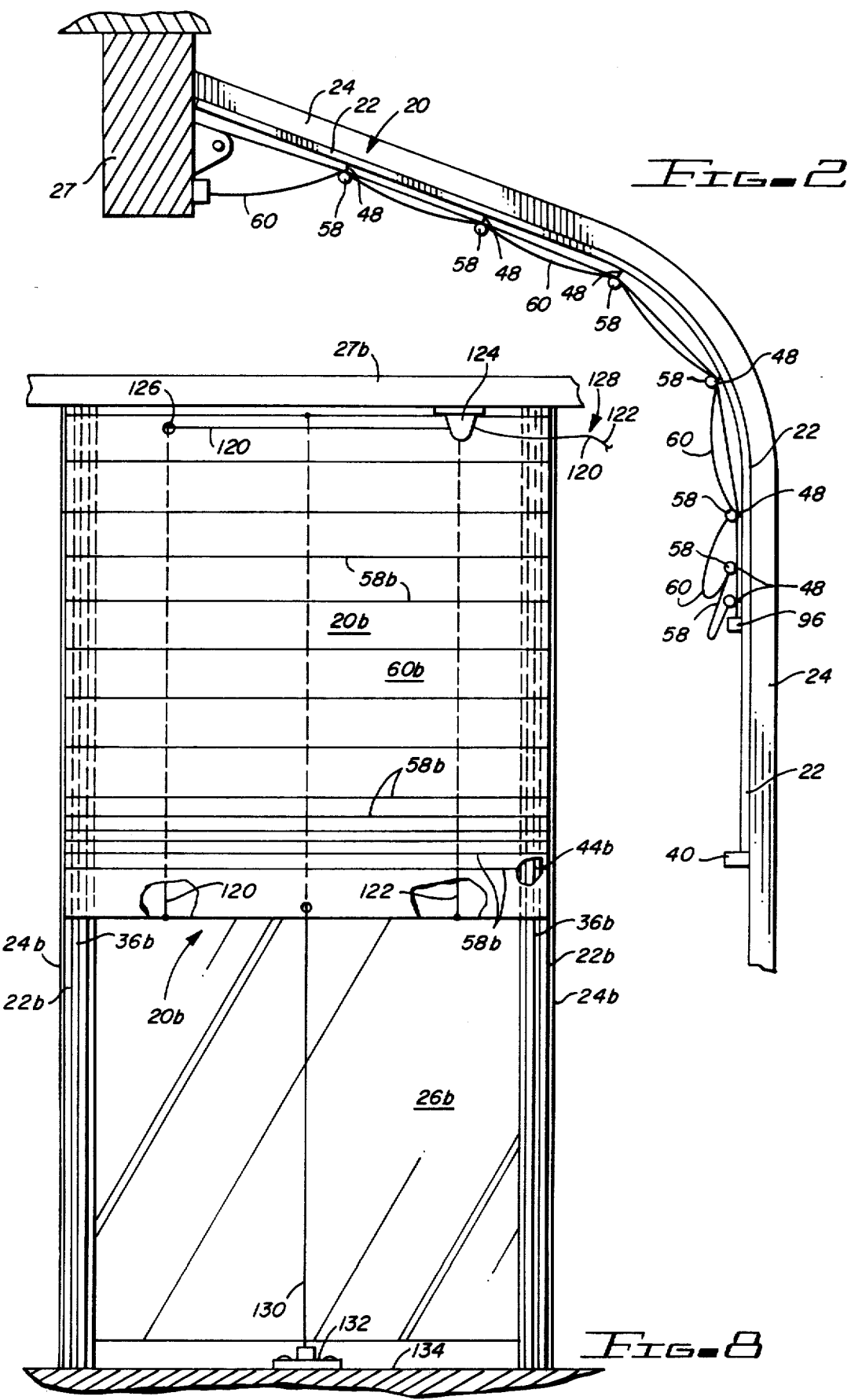

U.S. Patent   Dec. 10, 1985   Sheet 3 of 3   4,557,310
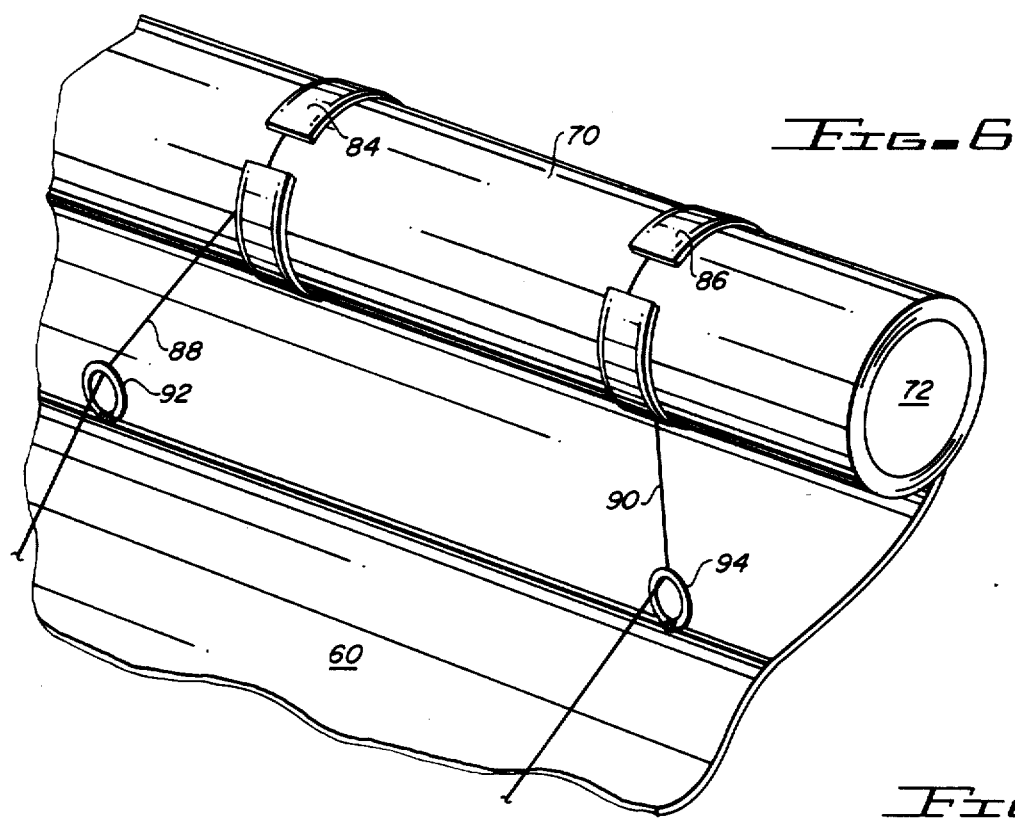
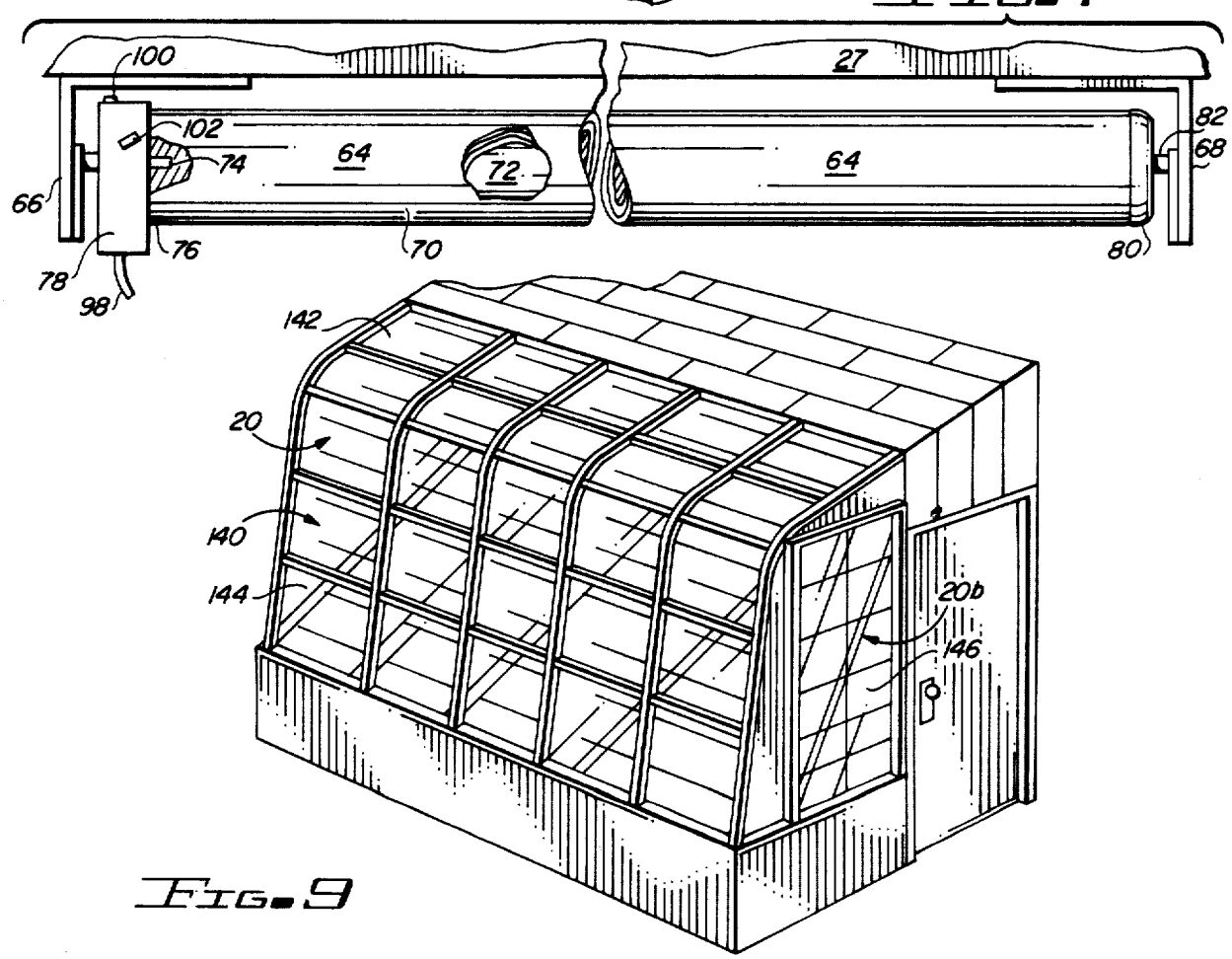

MOVABLE SUN SHADE SYSTEM

BACKGROUND OF THE INVENTION

1. Field of the Invention

The present invention generally relates to sun screens and more particularly to an improved type of movable sun shade assembly

2. Prior Art

Conventional types of window shades are only useful for covering flat, usually vertical windows. They are not well adapted for modern curvilinear or multi-angular windows and found in certain newer homes, offices and greenhouses, since conventional shades would hang away from the window at their points of curvature or angles. Venetian blinds are also subject to the same problems.

Accordingly, there remains a need to provide simple, easy to install, movable sun shading system for curvilinear and multi-angular windows and for skylights and the like. Such sun shading system should be adaptable to a variety of applications and blend in well with the decor once installed.

SUMMARY OF THE INVENTION

The improved movable sun shade system of the present invention satisfies all the foregoing needs. The system is substantially as set forth in the Abstract above. Thus, the system includes two or more parallel tracks which can be disposed on opposite sides of a window and/or on mullions or the like. Alternatively, the tracks can be formed integral with the mullions. A plurality of shade carriers are slideably received in the tracks for movement therein. These carriers are connected to at least the sides of a sun shade at intervals along the length thereof. The carriers can also be connected to the shade intermediate its sides when the shade spans one or more mullions within the window area.

Each of the carriers comprises a hook or clip at the shade-engaging end, a shank extending into the track and a slide or roller(s) inside the track. Each track can have a partition to limit oscillation of the slide or roller in the track.

A shade mover in the form of a hand cord and brake assembly or a motorized roller and cord assembly is disposed adjacent an end of the shade to permit the shade to be extended or folded relative to the track and window. The system is equally adapted for use with flat, curvilinear or multi-angled windows and skylights. Further features of the invention are set forth in the following detailed description and accompanying drawings.

BRIEF DESCRIPTIONS OF THE DRAWINGS

FIG. 1 is a fragmentary schematic perspective view of a first preferred embodiment of the improved movable sun shade system of the present invention, shown installed on a curvilinear window array.

FIG. 2 is an enlarged, fragmentary schematic side elevation of the sun shade system of FIG. 1.

FIG. 3 is an enlarged, fragmentary, schematic rear elevation, partly in section, of a track, carrier and shade used in the embodiment of FIG. 1.

FIG. 4 is an enlarged, fragmentary, schematic front elevation, partly in section, of a pair of tracks useful in the sun shade system of the present invention.

FIG. 5 is an enlarged, fragmentary, schematic front elevation, partly in section, of a modified form of track useful in the sun shade system of the present invention.

FIG. 6 is an enlarged, schematic, fragmentary perspective view of a roller, clip and cord sub-assembly used in the system of FIG. 1.

FIG. 7 is an enlarged, schematic, fragmentary front elevation, partly broken away, of the roller and electric motor sub-assembly used in the system of FIG. 1.

FIG. 8 is a schematic front elevation, partly broken away, of a second preferred embodiment of the improved sun shade system of the present invention, shown mounted on a flat window.

FIG. 9 is a schematic perspective view of the embodiments of FIGS. 1 and 8 mounted on respectively, the multiplanar front and top windows and the side window of a modern greenhouse.

DETAILED DESCRIPTION OF THE PREFERRED EMBODIMENT

FIGS. 1-3, 6 and 7

A first preferred embodiment of the improved movable sun shade system of the present invention is schematically depicted in FIGS. 1-3, 6 and 7. Thus, system 20 is shown which comprises a plurality of curved parallel tracks 22 mounted on curved mullions 24 separating window panes 26. The upper end of each mullion 24 terminates in a header 27 (FIG. 2). Each track 22, as shown in FIG. 3, is generally rectangular in traverse cross-section, can be formed of metal, wood, ceramic, plastic or the like and comprises a closed rear wall 28, closed side walls 30 and 32 and a front wall 34 defining a central opening 36. Each track 22 is secured to a mullion 24, by screws 38 extending through rear wall 28 into mullion 24 (FIG. 3) at intervals along the length of track 22. If desired, the tracks can be formed integrally with the mullions, as a part thereof.

Each track 22 includes a stop plate or box 40 secured at the lower end 42 thereof to prevent carriers 44 disposed in track 22 from sliding out therefrom.

As shown more particularly in FIG. 3, each carrier 44 includes a shank 46 extending into track 22 through opening 36, a hook 48 connected to the outer end of shank 46 and disposed outside of track 22, and a pair of rollers 50 and 52 secured by spindles 54 and 56 to the inner end of shank 46.

The hook 48 of each carrier 44 is releasably disposed around a thin cross-bar 58 disposed across and connected to resilient, flexible, foldable shade 60. A plurality of parallel cross-bars 58, are disposed along the length of shade 60 and a plurality of carriers 44 are hooked to cross bars 58 where bars 58 and tracks 22 intersect. Openings 62 can be made in shade 60 to facilitate connection of each hook 48 to a bar 58, as shown in FIG. 3.

A motorized roller assembly 64, as shown particularly in FIGS. 6 and 7, is used to urge shade 60 to fold up and unfold down along the length of tracks 22. Assembly 64 is disposed in spaced brackets 66 and 68 secured to header 27 and comprises a hollow cylindrical elongated roller 70, which slideably receives an elongated power driven cylinder 72. Cylinder 72 is keyed to roller 70 at point 74. One end 76 of cylinder 72 is secured to and rotatably driven by electric motor 78 in turn secured to bracket 66, while the opposite end 80 of cylinder 72 is rotatably secured by pin 82 to bracket 68.

Now referring to FIG. 6, to the outer surface of roller 70 is secured a spaced pair of flexible resilient split clips 84 and 86, which trap the upper ends of pull cords 88 and 90. Cords 88 and 90 runs down through O-rings 92 and 94, respectively, to the lower end 96 of shade 60 (FIG. 1). O-rings 92 and 94 are secured to shade 60 and are offset laterally of rings 84 and 86 so that cords 88 and 90 spool around roller 70 and do not bunch up. Operation of motor 78 in one direction of rotation causes cords 88 and 90 to wind up and shade 60 to fold up and thus raise on panes 26, while rotation of motor 78 in the opposite direction allows cords 88 and 90 to unwind and shade 60 to lower on window panes 26. Operation of motor 78 can be by means of a two-way switch (not shown) in current line 98 (FIG. 7). The speed and/or extent of rotation of motor 78 can be adjusted by reset buttons 100 and 102 (FIG. 7).

Accordingly, system 20 is simple and highly effective, with shade 60 following the contours of panes 26 and mullions 24, separated therefrom by a uniform distance throughout the length of travel of shade 60. System 20 is adaptable to flat, curvilinear and multi-angled window arrays to provided perfectly controlled, decorative, easily installed sun shading.

FIGS. 4 and 5

FIG. 4 shows a pair of tracks 22 mounted in spaced relation on a header 27 or mullion 24, as may be required in certain applications. FIG. 5 schematically depicts an improved version of the track used in system 20. Thus, track 22a is shown which is identical to track 22, except for the addition in track 22a of a transverse partition in the form of a pair of spaced ledges 110 and 112 which closely approximate rollers 50 and 52 of carrier 44 and thus prevent rollers 50 and 52 from jiggling and oscillating to any great extent during travel of carrier 44 along track 22a.

FIGS. 8 and 9

A second preferred embodiment of the improved movable sun shade system of the present invention is schematically depicted in FIG. 8, Thus, system 20b is shown. Components thereof which are similar to those of system 20 bear the same numerals but are succeeded by the letter "b". System 20b includes a pair of spaced vertical tracks 22b secured to the front faces of mullions 24b disposed on opposite sides of a single ledge window pane 26b. A header 27b overlies and is connected to the upper ends of tracks 22b and mullions 24b. A plurality of carriers 44b are secured to tracks 22b through openings 36b and to cross-bars 58b of shade 60b.

The shade mover assembly, however, differs from that of system 20. Thus, a pair of spaced cords 120 and 122 are secured to the bottom end 96b of shade 60b, extend up vertically to adjacent header 27b and then into a cord brake 124 secured to header 27b. Cord 120 additionally traverses the width of shade 60b to reach brake 24 after passing through opening 126 in shade 60b (FIG. 8). Shade 60b is raised (folded up) or lowered (unfolded) on tracks 22b by pulling on cord 128 (which comprises cords 120 and 122 braided together) in the appropriate direction, for example, down to release brake 124 and pull shade 60b up, then sideways to set brake 124.

In order to prevent shade 60b from sagging or buckling, a wire 130 may be passed vertically therethrough from a base tension plate 132 secured to floor 134 up through an opening 136 and to header 27b to which wire 130 is secured. Wire 130 is unnecessary when shade 60b is relatively narrow, for example, less than about 30–36 inches in width; except when system 20b is installed in an other than vertical orientation. For example, if system 20b is installed in a ceiling under a skylight, wire 130 will keep shade 60b from sagging. For convenience sake, in such an installation a motorized shade mover assembly such as assembly 64 shown in system 20, would be preferred to cords 120, 122 and 128 and cord brake 124. Moreover, in such an application spring tension means (not shown) or the like should also be used to help move shade 60b, since gravity may not be available for that purpose. In any event, system 20b is neat, efficient, attractive and easily installed, maintaining a proper distance from pane 26b regardless of the orientation of pane 26b, in the same general manner as does system 20.

FIG. 9 illustrates the use of both system 20 and system 20b in a greenhouse 140. System 20 is used to cover multi-angled window panes 142 and 144 very effectively, while system 20b is used to cover flat pane 146 very effectively.

It should be understood that system 20b can be used on any flat plan surface, either vertical or horizontal, or otherwise, (as in skylight applications).

Various modifications, changes, alterations and additions can be made in the improved movable sun shade system of the present invention, its components and their parameters. All such modifications, changes, alterations and additions as are within the scope of the appended claims form part of the present invention.

What is claimed is:

1. An improved moveable shade system in combination with a window, skylight or the like which lies in multiple planes, which planes lie at an obtuse angle with respect to one another, said window, skylight or the like including a first substantially vertically extending section and a second section inclined thereto forming said obtuse angle, each of said sections being supported by frame means in the form of mullions, said system further comprising, in combination:
   (a) a plurality of substantially parallel, continuous spaced tracks lying in said multiple planes and mounted on said mullions, said tracks having significant lengths thereof lying respectively in each of said first and second sections, said tracks including a smoothly curved portion defining a transition portion between said sections;
   (b) a plurality of shade carriers secured to and freely moveable along said tracks;
   (c) a shade secured to said carriers adapted to move with said carriers along said tracks;
   (d) shade urging means connected to said shade for urging said shade and carriers along said tracks from a first lowered position to a second raised position, and
   (e) retaining means for securing and maintaining said shade in said second position,
   (f) means for facilitating said shade to return to said first position by force of gravity when said retaining means is released and said shade urging means is deactivated.

2. The improved shade system of claim 1 wherein each of said tracks comprises a substantially closed rear wall, closed side walls and a front wall having an opening adapted to receive a portion of each of said carriers.

3. The improved shade system of claim 2 wherein each said track is generally rectangular in cross section and includes a transverse partition to restrict oscillation of said carrier in said track.

4. The improved shade system of claim 3 wherein each of said carriers comprises a hook which fits through openings in said shade, a shank connected to said hook and extending into said track through said track opening, and wherein said facilitating panes include rollers connected to said shank for easy riding of said carrier in said track.

5. The improved shade system of claim 4 wherein each said track includes a track stop to prevent slipping of said rollers from said track.

6. The improved shade system of claim 1 wherein said shade urging means comprises at least one cord extending from adjacent one end of said shade to the opposite end of said shade, and a cord brake through which said cord passes, for releasably securing said cord in a desired shade-holding position.

7. The shade assembly of claim 1 and further including a plurality of transversely extending, substantially rigid, shade support members disposed along the length of said shade, said carrier members secured to and supporting said support members which, in turn, support said shade.

8. The shade assembly of claim 1 wherein said tracks have a longitudinal opening extending along said tracks, said opening being adapted to receive said carrier members therein, and wherein said openings face away from said window, skylight or the like.

* * * * *